Feb. 6, 1973 H. EHRENFELLNER 3,714,700
APPARATUS FOR ORIENTING SLENDER PARTICLES
Filed March 12, 1971
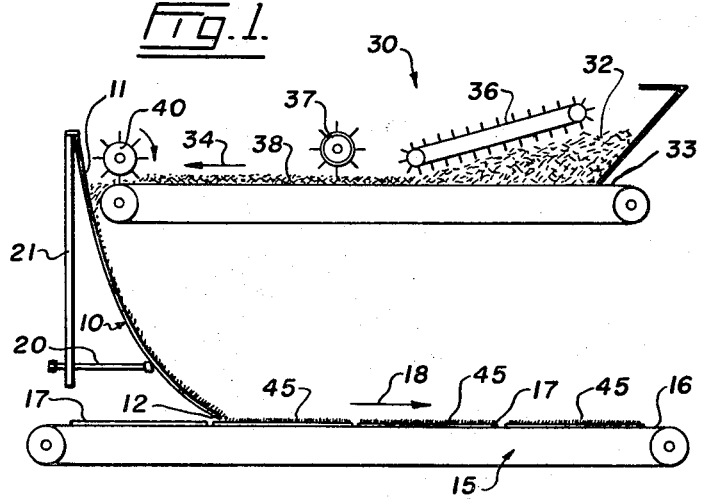
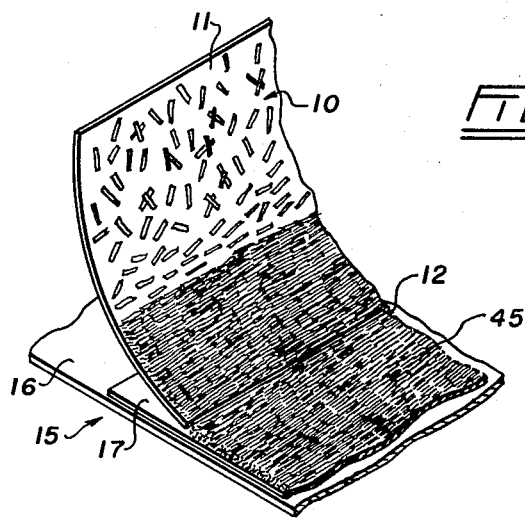
INVENTOR
HUBERT EHRENFELLNER
BY
Featherstonhaugh & Co.
ATTORNEYS United States Patent Office
3,714,700
Patented Feb. 6, 1973

3,714,700
APPARATUS FOR ORIENTING SLENDER
PARTICLES
Hubert Ehrenfellner, Surrey, British Columbia, Canada, assignor to MacMillan Bloedel Limited, Vancouver, British Columbia, Canada
Filed Mar. 12, 1971, Ser. No. 123,545
Int. Cl. B23p 17/00
U.S. Cl. 29—419                             10 Claims

ABSTRACT OF THE DISCLOSURE

A method of and apparatus for orienting slender particles such as cellulosic splinters or flakes used in the manufacture of panels, cores for plywood panels and other boards, and in which the slender particles are oriented by a curved chute which directs them onto a mat of the particles.

---

This invention relates to methods of and apparatus for orienting slender particles, and particularly wood particles to be made into panels, cores for plywood panels and other purposes.

The prior art discloses panels and cores made up of oriented particles or flakes, and the advantages of this arrangement have been fully dealt with. However, it has been difficult to orient the particles rapidly in production lines. Some efforts have been made to orient the particles, but these generally involve complex vibrating mechanisms and grids, the particles themselves are frequently broken down to generally unacceptable sizes, and/or it has been difficult to get the special orienting equipment into standard production lines.

The method and apparatus according to the present invention orients slender particles very quickly and easily, and without damaging them. In adition, the apparatus can be used with existing equipment without any serious modification of the latter. For example, standard particleboard felting apparatus has been used in association with the present apparatus. The furnish supply and metering system of the felter was utilized without any change, and the particles were discharged by a standard picker roller.

The method according to the present invention of orienting slender particles comprises sliding the particles down a curved chute on to a mat of the particles moving away from the chute, said chute being curved in the direction of movement of the mat.

The apparatus for carrying out this method is very simple, and it comprises a chute curved about a horizontal axis and having a lower discharge end, a conveyor at the discharge end of the chute to move in the direction away from said end, and means for directing slender particles on to the chute at a level spaced above the conveyor.

The particles are discharged onto the upper part of the chute at random, but any particles that are not substantially parallel with the axis of curvature of the chute have to span part of the curve, and as a result, they quickly shift into the desired oriented position. The discharge end of the chute is preferably at the level of a mat of the fibers on a conveyor so that the particles do not lose the desired orientation during the transfer from the chute to the mat.

An example of apparatus in accordance with this invention is illustrated in the accompanying drawings, in which FIG. 1 is a diagrammatic side elevation of the orienting apparatus, FIG. 2 is an enlarged isometric view of the curved chute, showing the particles thereon and being discharged onto a mat, and FIG. 3 is a diagram illustrating the effect of the chute on the particles.

Referring to the drawings, 10 is a curved orienting chute in accordance with this invention having an upper or inlet end 11 and a lower or discharge end 12. This plate is supported in any desired manner above a caul conveyor 15 having an upper surface or run 16 for carrying cauls 17 moving away from the chute in the direction indicated by arrow 18. It is preferable to be able to adjust the height of the chute discharge end 12 above the caul 17 or the conveyor surface 15, and in this example, an adjusting rod 20 is secured to the undersurface of the chute near the lower end thereof. This rod can be shifted back and forth relative to a support 21 so as to raise and lower the discharge end 12 of the chute.

Chute or plate 10 is curved about an axis which is above and extends transversely of conveyor 15 so that the discharge end 12 extends in the direction of movement of the conveyor. The radius of the curvature of the chute depends on the type of particle or flake being handled by this apparatus. Curvatures of 18 to 36 inches radius have been used, and a curvature of 24 inches has been found to be desirable. The sizes of the particles depends upon the purpose for which they are required. One of the main uses of this apparatus is to orient particles or flakes for particle boards. The particles are cellulosic flakes or slender bundles, and the length of these can be any practical size, such as, for example, from about ⅛ inch to about 3 inches long. The general thickness of these bundles can be as desired, and thicknesses from about 0.005 to 0.065 inch and above have been handled.

The particulate material is fed or directed to chute 10 near the upper end 11 thereof in any desired or convenient manner. In this example, standard particleboard furnish metering apparatus 30 is used for this purpose. Particulate material 32 is directed onto the upper surface of a metering belt 33 which is moving in the direction of arrow 34 towards the chute. The usual levelling belt 36 and levelling picker roller 37 form the particulate material into a layer 38 on belt 33. A picker roller 40 discharges the particulate material from layer 38 onto the adjacent portion of curved chute 10. Metering belt 33 and its associated elements, and caul conveyor 15 are standard equipment in felting operations, and it is only necessary to locate these so that curved chute 10 will receive the particles from the picker roller and will discharge oriented particles onto the cauls carried by conveyor 15.

When the particles are discharged onto orienting crute 10, they are randomly arranged and extend in all directions. However, as the particles slide down the chute they change direction until they all extend transversely of the chute and substantially parallel with the axis of curvature thereof. When the particles reach the discharge end 12 of the chute, they are properly oriented, and are laid on the mat 45 formed on the caul that is being moved beneath and away from said discharge end.

FIG. 3 diagrammatically illustrates the effect of chute 10 on the particulate material. In this figure the curve of the chute is exaggerated, and 48 is a particle that has landed on the chute so as to extend longitudinally thereof. It will be seen that this particle spans a portion of the curve of the chute, but there is nothing to keep it in this position as the particle moves down the chute. Friction and contact with other particles quickly causes the particle to swing into the position illustrated by particle 49 which fits into the chute curve and extends substantially parallel with the axis of the curve. Particle 49 will remain in this position relative to the chute curve unless it is subjected to some relatively great force in the direction longitudinally of the chute. Thus, the particles are oriented in a vary simple, gentle and rapid manner, and this does not cause any appreciable delay in the process of forming the particles into mats on the caul conveyor.

The discharge end 12 of the chute should be just at or immediately above mat 45 on the caul conveyor. If the discharge end is too high, the particles can lose their orientation when they drop off said end. Therefore, it is desirable to lay the oriented particles on to the mat. The lower end of the chute is adjusted relative to the cauls in order to produce a mat of a desired thickness. When starting up the apparatus, it is desirable first to form a mat of particles on a caul at the lower end of the chute so that when the apparatus starts to operate, the oriented particles are discharged on to a mat. However, the discharge end can be shifted down to the level of the caul, in which case, it is gradually raised to the desired level above the caul surface for the required mats. As the curved chute discharges onto the mat in the direction of movement thereof, the particles remain in their proper oriented positions in the mat.

What is claimed is:

1. The method of orienting stiff slender particles which are long relative to the width and thickness thereof, which comprises moving the slender particles down a curved chute to form a mat of said particles moving away from the chute, said chute being curved in the direction of movement of the mat and said particles being oriented by the chute to extend transversely of the latter during movement down the chute.

2. The method as claimed in claim 1 in which said particles are discharged from the chute substantially at the level of the mat being formed.

3. The method as claimed in claim 1 in which said particles are thrown against the chute at a level spaced above said mat.

4. Apparatus for orienting stiff slender particles which are long relative to the width and thickness thereof, which comprises a chute curved about a horizontal axis from an upwardly extending portion to a substantially horizontal portion and having a lower discharge end, a conveyor at the discharge end of the chute to move in a substantially horizontal direction away from said end, and means for directing slender particles on to said upwardly extending portion of the chute, said particles being oriented by the chute to extend transversely of the latter during movement down the chute and then being discharged on to the conveyor.

5. Apparatus as claimed in claim 4 in which the discharge end of the chute is spaced above the conveyor.

6. Apparatus as claimed in claim 4 in which the substantially horizontal portion of the chute extends generally in the direction of movement of the conveyor.

7. Apparatus as claimed in claim 4 in which the curvature of the chute has a radius of from about 18 to 36 inches.

8. Apparatus as claimed in claim 4 in which the discharge end of the chute is anywhere from the level of said conveyor to about ¾ inch above the conveyor.

9. Apparatus as claimed in claim 4 in which the discharge end of the chute extends generally in the direction of movement of the conveyor, and the curvature of the chute has a radius of from about 18 to 36 inches.

10. Apparatus as claimed in claim 4 in which the discharge end of the chute extends generally in the direction of movement of the conveyor, the curvature of the chute has a radius of from about 18 to 36 inches, and the discharge end of the chute is anywhere from the level of said conveyor to about ¾ inch above the conveyor.

References Cited

UNITED STATES PATENTS

| 456,336 | 7/1891 | Paris | 198—84 X |
|---|---|---|---|
| 587,509 | 8/1897 | Roberts | 198—84 X |
| 1,297,926 | 3/1919 | Starr | 34—203 |
| 2,674,755 | 4/1954 | Schlicksupp | 29—211 R X |
| 2,729,028 | 1/1956 | Slayter et al. | 65—3 |
| 3,187,422 | 6/1965 | Morgan | 29—419 |

CHARLES W. LANHAM, Primary Examiner

V. A. DIPALMA, Assistant Examiner

U.S. Cl. X.R.

29—211 R, 211 C; 193—43 R; 198—33 AA, 84